Figure 1:
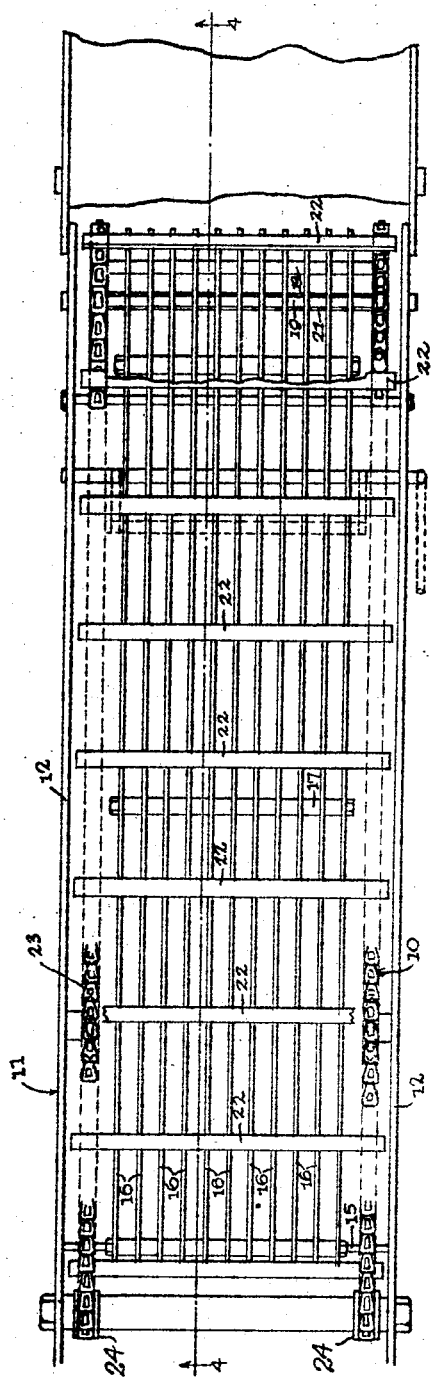

March 23, 1926.

A. L. HOOVER

SEPARATOR FOR DIGGERS

Filed Nov. 28, 1924

1,578,034

A. L. Hoover
Inventor
Attorneys

Patented Mar. 23, 1926.

1,578,034

UNITED STATES PATENT OFFICE.

ARTHUR L. HOOVER, OF AVERY, OHIO, ASSIGNOR TO THE HOOVER MANUFACTURING COMPANY, OF AVERY, OHIO, A CORPORATION OF OHIO.

SEPARATOR FOR DIGGERS.

Application filed November 28, 1924. Serial No. 752,611.

*To all whom it may concern:*

Be it known that I, ARTHUR L. HOOVER, a citizen of the United States of America, and a resident of Avery, in the county of Erie and State of Ohio, have invented certain new and useful Improvements in Separators for Diggers, of which the following is a full, clear, and exact description.

Figure 2:
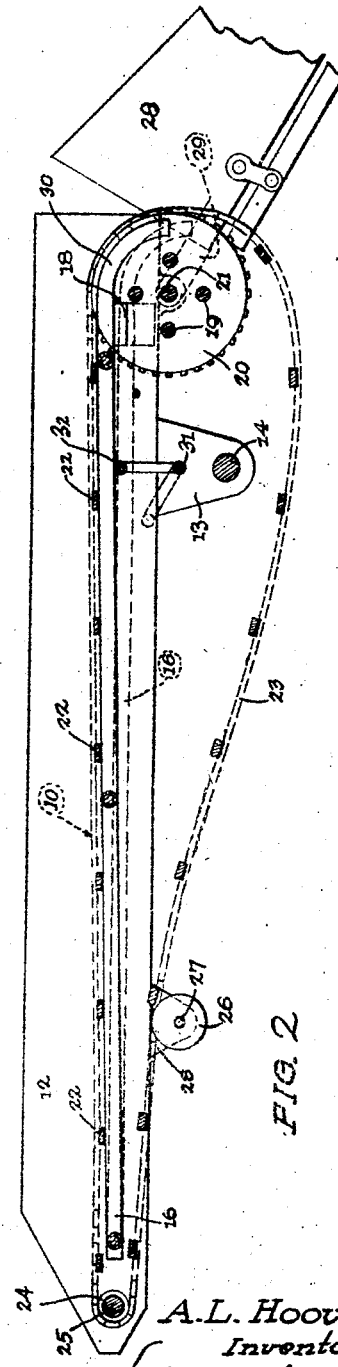

My invention relates to diggers and the principal object of my invention is to provide a new and improved digger. In the drawings accompanying this specification and forming a part thereof I have shown, for purposes of illustration, one form which my invention may assume. In these drawings:

Figure 1 is a plan view of portions of a digger embodying this illustrative form of my invention, while Figure 2 is a section on the line 2—2 of Figure 1.

The digger herein shown includes a frame 11 comprising a pair of side plates 12 to which are secured depending brackets 13 carrying the main axle 14 by which the digger is supported in the usual manner on wheels not shown herein. Also mounted between the side plates 12 is a main rod 15 on which are pivoted the lower ends of a plurality of bars 16 secured together in spaced relation by the rod 15 and auxiliary rods 17, arranged to jointly form a slideway upon which may be moved the material dug, and provided at their upper ends with depending lugs 18 arranged to be engaged by actuating rods 19 carried by and extending between two sprocket wheels 20 mounted on a shaft 21 carried by and extending between the two side plates 12.

Having its upper pass positioned above the bars 16 and supported intermediate its ends by the bars 16 is a conveyor 10 consisting of a plurality of cross pieces 22 arranged to move along the bars 16 and be supported thereby and connected at their ends to and supporting two side chains 23 which pass over the wheels 20 at the upper end of the digger, at the lower end of the digger pass over wheels 24 carried by a front cross rod 25, and on the return pass are supported intermediate the wheels 20 and 24 by wheels 26 carried by a cross shaft 27 supported in brackets 28 depending from the side plates 12. The conveyor is operated from the wheels 20 through a connection not shown herein but extending between the main axle 14 and the shaft 21 to which the wheels 20 are secured.

Positioned rearwardly of the mechanism above described is a distributor 28 supported from the frame in any suitable manner as by means of brackets 29 carried on the shaft 21, arranged to distribute the material discharged from the upper end of the conveyor, and secured in the desired adjusted position relative to the frame 11 by means usual in the art but not herein shown.

Secured to the upper ends of the bars 16 are extensions 30, curved in conformity with the curve of the chains 23 as these chains 23 pass around the wheels 20, and extending rearwardly to substantially the full extent of the conveyor 10 to thus support the material at all points within the limits of the conveyor and insure delivery of the material to the distributor 28 rearwardly of the conveyor 10.

Mounted in the brackets 13 is a cross rod 31 having an offset central portion 32 adapted to engage each of the bars 16 to hold these bars 16 in the maximum elevated position to which they can be raised by engagement of the actuating rods 19 with the lugs 18, operable by means of a handle 33 disposed outside the side plate 12 within easy reach of the operator, and adapted to be swung into the position shown in dotted lines in which the bars 16 are not so supported but are subjected to the free action of the actuating rods 19.

It will be apparent from the above description that the materials dug, the food product, the vines, and the dirt, are delivered onto the bars 16 and then moved along these bars 16 by means of the cross pieces 22 of the conveyor 10, that during this process a large amount of the dirt will fall through the bars 16, that as the digger advances the actuating rods 19 will continually oscillate the bars 16 to oscillate the vines and the food product carried by the bars 16 to thus facilitate separation of the dirt from the vines and the food product, and that the vines and the food product will ultimately be delivered from the discharge end of the slideway and, because of the extensions 30, will be delivered at a point which will prevent any of the vines or food product dropping within the conveyor 10 and insure the delivery of the vines and food product rearwardly of the conveyor onto the distributor 28. It will also be apparent that under those conditions wherein oscillation of the bars 16 is not required this oscillation may be dispensed with by holding the bars 16 in elevated position by means of the eccentric central portion 32 of the cross rod 31.

Those skilled in the art will readily find in this illustrative embodiment of my invention advantages other than those specifically pointed out or suggested herein and in addition will readily realize that the particular embodiment of my invention herein illustrated may be variously changed and modified without departing from the spirit of my invention or sacrificing the advantages thereof. It will therefore be understood that the disclosure herein is illustrative only and that my invention is not limited thereto.

I claim:

1. In a digger: slideway means arranged to directly support material conveyed thereon from its point of reception to the delivery end of said slideway means; means to oscillate said slideway means vertically; and endless means ineffective to support said material, comprising cross members arranged to pass along the upper face of said slideway means over said delivery end and return below said slideway means, and effective to move said material along said slideway means to said delivery end and discharge said material from said delivery end; said slideway means being formed at said delivery end closely conforming to the downward curvature of the path of movement of said endless means at said delivery end, and means to hold said slideway means in close proximity to said endless means at said delivery end so that said slideway means extends and supports said material to the limit of extent of said endless means.

2. In a digger: a plurality of spaced parallel bars arranged to receive the material dug and, as said material is transmitted along said bars, to support a portion thereof and permit another portion to fall through between said bars; means for raising said bars and then permitting said bars to drop, to facilitate separation of said portions of said material; and cam means arranged to engage each of said bars individually and hold all of said bars in an elevated position out of engagement with said oscillating means.

3. In a digger: a plurality of spaced parallel bars arranged to receive the material dug and, as said material is transmitted along said bars, to support a portion thereof and permit another portion to fall through between said bars; means for raising said bars and then permitting said bars to drop, to facilitate separation of said portions of said material; and a shaft having an offset portion arranged to engage each of said bars and hold all of said bars in an elevated position out of engagement with said oscillating means.

In testimony whereof, I hereunto affix my signature.

ARTHUR L. HOOVER.